United States Patent
Song et al.

(10) Patent No.: US 11,246,203 B2
(45) Date of Patent: *Feb. 8, 2022

(54) TAPPED SINGLE-STAGE BUCK CONVERTER LED DRIVER

(71) Applicant: Lumileds LLC, San Jose, CA (US)

(72) Inventors: Zhi Hua Song, Palo Alto, CA (US); Wouter Soer, Utrecht (NL)

(73) Assignee: Lumileds LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/286,360

(22) Filed: Feb. 26, 2019

(65) Prior Publication Data

US 2019/0268984 A1 Aug. 29, 2019

Related U.S. Application Data

(63) Continuation-in-part of application No. 15/906,797, filed on Feb. 27, 2018.

(30) Foreign Application Priority Data

Apr. 5, 2018 (EP) .................................... 18165939

(51) Int. Cl.
   - *H02M 3/156* (2006.01)
   - *H02M 1/44* (2007.01)
   - *H05B 45/48* (2020.01)
   - *H05B 45/375* (2020.01)
   - *H02M 7/06* (2006.01)

(52) U.S. Cl.
   CPC ............ *H05B 45/48* (2020.01); *H02M 3/156* (2013.01); *H05B 45/375* (2020.01); *H02M 1/44* (2013.01); *H02M 7/06* (2013.01)

(58) Field of Classification Search
   None
   See application file for complete search history.

(56) References Cited

U.S. PATENT DOCUMENTS

| | | | | |
|---|---|---|---|---|
| 7,863,831 B2 * | 1/2011 | Vos | ..................... | H05B 33/0827 315/155 |
| 8,324,840 B2 * | 12/2012 | Shteynberg | .......... | H05B 33/083 315/185 R |
| 8,963,431 B2 * | 2/2015 | Berg | .................. | H05B 33/0809 315/122 |
| 9,265,114 B2 * | 2/2016 | Palmer | ................... | H05B 45/20 |
| 9,271,345 B2 * | 2/2016 | Welten | ................. | H05B 45/395 |

(Continued)

*Primary Examiner* — Anh Q Tran

(74) *Attorney, Agent, or Firm* — Volpe Koenig

(57) ABSTRACT

Systems, devices and methods are described herein. An integrated light emitting diode (LED) lighting system includes an electronics board. An alternating current (AC) input is disposed on the electronics board. Multiple strings of LED devices are disposed on the electronics board, each having an individual voltage threshold. A buck converter is disposed on the electronics board and is electrically coupled to provide a direct current (DC) current based on an AC current at the AC input. A switching circuit is disposed on the electronics board and is electrically coupled to the strings of LED devices to apply the DC current to each of the strings in a sequence beginning at a time when an instantaneous voltage level at the AC input reaches the individual threshold voltage of a first one of the strings of LED devices in the sequence.

12 Claims, 14 Drawing Sheets

(56) References Cited

U.S. PATENT DOCUMENTS

| | | |
|---|---|---|
| 9,332,605 B2 | 5/2016 | Nederbragt et al. |
| 9,967,933 B2* | 5/2018 | Reed ..................... H05B 45/46 |
| 2011/0210674 A1 | 9/2011 | Melanson |
| 2014/0042925 A1* | 2/2014 | Wang .................... H05B 45/48 |
| | | 315/232 |
| 2014/0103813 A1 | 4/2014 | Moss |
| 2014/0139125 A1* | 5/2014 | Lee ....................... H05B 45/44 |
| | | 315/186 |
| 2014/0210357 A1 | 7/2014 | Yan et al. |
| 2015/0108909 A1* | 4/2015 | Rupp .................. H05B 33/083 |
| | | 315/188 |
| 2015/0123568 A1 | 5/2015 | Yang et al. |
| 2016/0353535 A1* | 12/2016 | Arulandu ............... H05B 45/37 |
| 2016/0374166 A1* | 12/2016 | Chen .................. H05B 33/083 |
| 2018/0092179 A1 | 3/2018 | Guo et al. |
| 2018/0220502 A1* | 8/2018 | Morales ................. F21K 9/238 |

* cited by examiner

TAPPED SINGLE-STAGE BUCK CONVERTER LED DRIVER

BACKGROUND

Light emitting diodes ("LEDs") are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications ranging from indoor illumination to automotive lighting. Accordingly, the need exists for improved LED-based illumination systems that harness the advantages of LEDs to provide high-quality illumination.

SUMMARY

Systems, devices and methods are described herein. An integrated light emitting diode (LED) lighting system includes an electronics board. An alternating current (AC) input is disposed on the electronics board. Multiple strings of LED devices are disposed on the electronics board, each having an individual voltage threshold. A buck converter is disposed on the electronics board and is electrically coupled to provide a direct current (DC) current based on an AC current at the AC input. A switching circuit is disposed on the electronics board and is electrically coupled to the strings of LED devices to apply the DC current to each of the strings in a sequence beginning at a time when an instantaneous voltage level at the AC input reaches the individual threshold voltage of a first one of the strings of LED devices in the sequence.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

Figure 1:
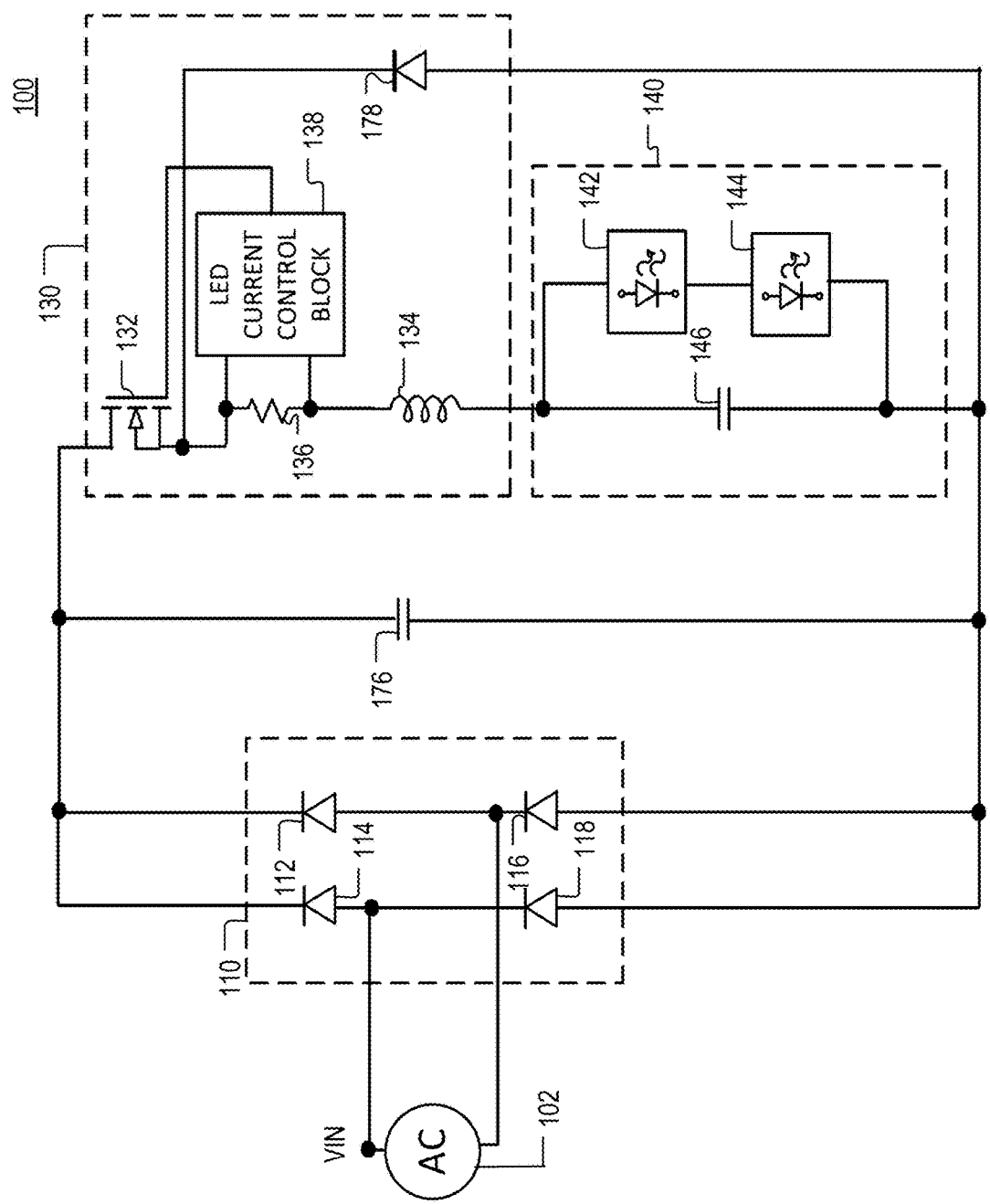
FIG. 1 is a diagram of an example of an LED driver circuit.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

Semiconductor light emitting devices (LEDs) or optical power emitting devices, such as devices that emit ultraviolet (UV) or infrared (IR) optical power, are among the most efficient light sources currently available. These devices (hereinafter "LEDs"), may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required.

An LED driver is described herein for driving a plurality of strings of LED devices. The LED driver may include a Buck converter circuit (e.g., a Buck converter section) and a tapped stage that reduces the amount of total harmonic distortion (THD) produced by the Buck converter circuit. In operation, the tapped stage may switch each string of LED devices on and off based on the magnitude of instantaneous voltage that is supplied to the LED driver. When the instantaneous voltage is too low to power all of the strings of LED devices, one or more of the strings of LED devices may be switched off. When the strings of LED devices are switched off, the load voltage that is placed on the Buck converter circuit may decrease. This may prevent the Buck converter circuit from becoming switched off and cause the Buck converter circuit to remain switched on for longer time periods. As a result, the amount of THD that is normally generated during periods when the Buck converter circuit is switched off may also decrease.

Examples of various LED drivers will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only, and they are not intended to limit the disclosure in any way. Like numbers refer to like elements throughout.

FIG. 1 is a diagram of an example of an LED driver circuit 100. The LED driver circuit 100 may include a rectifier circuit 110, a Buck converter circuit 130, and a load section 140. The rectifier circuit 110 may be arranged to receive an AC voltage VIN from an AC source 102 and supply a rectified DC voltage to the Buck converter circuit 130. The AC source 102 may include a municipal power main and/or any other suitable source of AC current. The rectifier circuit 110 may include any suitable type of rectifier circuit. In some implementations, the rectifier circuit 110 may include diodes 112, 114, 116, and 118, arranged as shown.

The Buck converter circuit 130 may be a single-stage Buck converter circuit. The Buck converter circuit 130 may include a metal oxide-semiconductor field effect transistor (MOSFET) 132, an inductor 134, a resistor 136, a current control block 138, and a diode 178. The current control block 138 may be coupled to the gate of the MOSFET 132 as shown. The current control block 138 may be configured to intermittently turn the MOSFET 132 on and off in accordance with a predetermined frequency. When the MOSFET 132 is turned on, current flows through the inductor 134. During this period, the inductor 134 builds up its magnetic energy. When the MOSFET 132 is turned off, the inductor 134 releases the magnetic energy to supply current to the load section 140 through the diode 178. The current supplied to the load section 140 can be regulated to required levels by varying the switching pattern of the MOSFET 132 using the current control block 138. The current ripples due to high-frequency switching can be largely absorbed by capacitor 176 such that most of the ripples do not reach the AC input side and cause electromagnetic compatibility (EMC) issues.

The load section 140 may include the light source 142, the light source 144, and a capacitor 146 that is coupled in parallel with the light sources 142 and 144 to absorb high frequency current ripples. Each of the light sources 142 and 144 may include one or more LEDs. In some implementations, the light source 142 may have a threshold voltage of VLED1 (e.g., 30V) and the light source 144 may have a threshold voltage VLED2 (e.g., 30V). The load section 140 may have a combined threshold voltage that is equal to the sum of VLED1 and VLED2 (e.g., 60V).

As used herein, "threshold voltage" may refer to the minimum voltage needed to be applied across a light source (or an LED) in order for the light source (or LED) to be turned on. By way of example, a light source (or an LED) may be considered turned on if the light source (or LED) conducts current. As another example, a light source (or an LED) may be considered turned on if the light source (or LED) emits light.

In the example of FIG. 1, the LED driver circuit 100 is a single stage Buck converter LED driver. As such, the LED driver circuit 100 has two primary functions. The first function is a power factor correction (PFC) function, which involves controlling the quality of input current. The second function is an LED current regulation function, which involves controlling the amount of current that reaches the load section 140. The PFC function is particularly challenging for the LED driver circuit 100 because the voltage output by the Buck converter circuit 130 is necessarily lower than the voltage that is input into the Buck converter circuit 130. Therefore, in a single stage AC input configuration, the Buck converter circuit 130 may only conduct current when the rectified instantaneous AC voltage VIN that is supplied by the AC source 102 is greater than the threshold voltage of the load section 140. In other words, during periods in which the instantaneous AC voltage VIN is lower than the threshold voltage of the load section 140, the Buck converter circuit 130 would not conduct. Periods during which the Buck converter circuit 130 does not conduct may be referred to as interruption periods.

Figure 2:
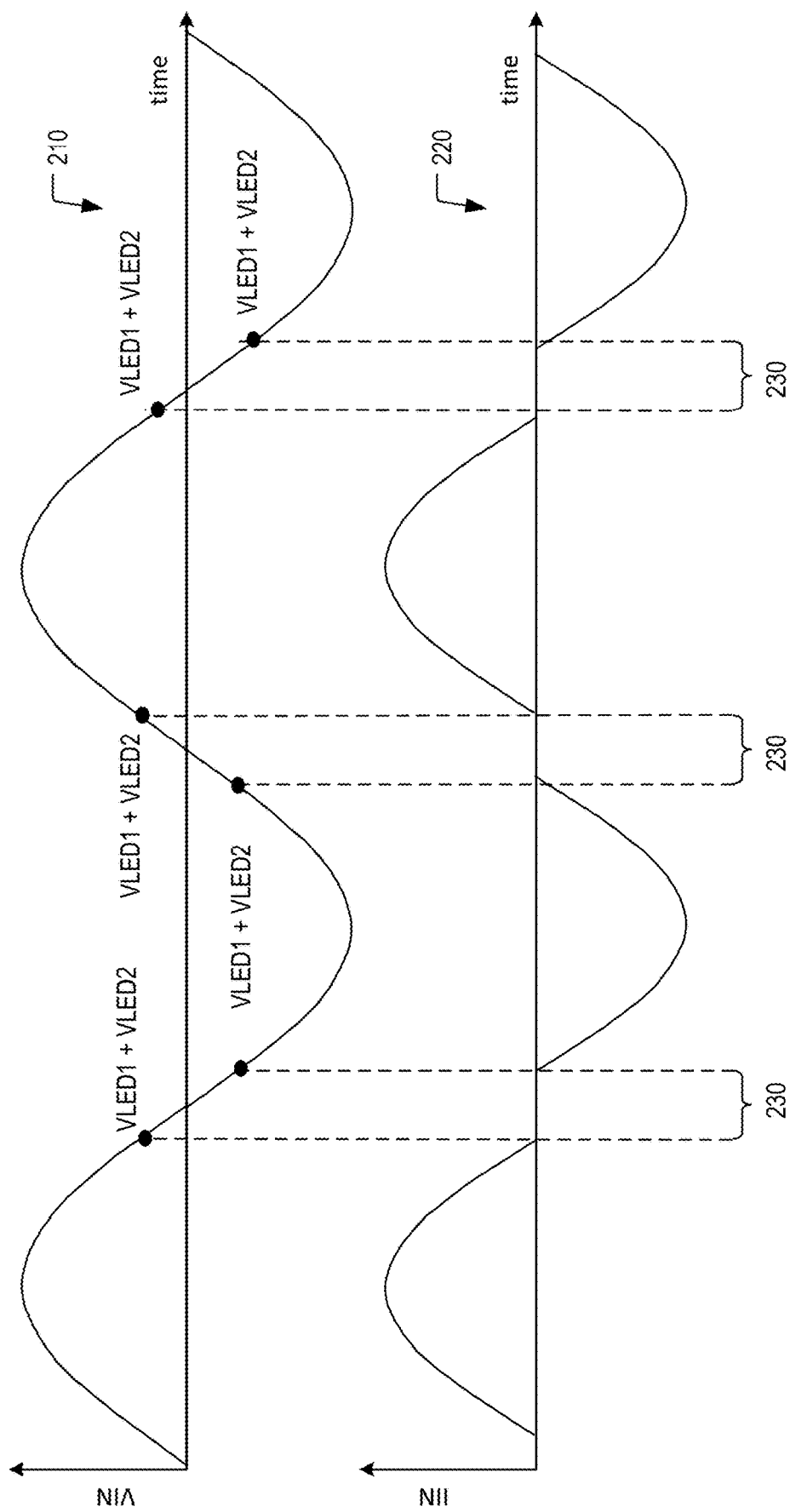
FIG. 2 is graph illustrating aspects of the operation of the LED driver circuit of FIG. 1.

FIG. 2 is a graph illustrating aspects of the operation of the LED driver circuit of FIG. 1. The graph includes plots 210 and 220, which illustrate a pattern at which interruption periods occur during the normal operation of the LED driver circuit 100. Plot 210 shows the input AC voltage VIN, which is supplied to the LED driver circuit 100 by the AC source 102, as a function of time. Plot 220 shows the input current IIN that is supplied to the LED driver circuit 100 by the AC source 102. As illustrated by the plot 220, the flow of the input current IIN is interrupted during interruption periods 230. During the interruption periods 230, the value of the current IIN is zero or close to zero. The interruption periods 230 may occur at times when the magnitude of the input AC voltage VIN is less than the threshold voltage of the load section 140 (VLED1+VLED2).

The interruption periods 230 of the LED driver circuit 100 may be characterized by an elevated concentration of harmonic components, which can result in the individual and total harmonic components of the input current IIN failing to meet legal requirements. Moreover, the elevated concentrations of harmonic components can lead to compromised circuit performance that renders impractical the use of Buck converter sections to drive LED-based light sources.

The occurrence of interruption periods when single-stage Buck converters are used to power LEDs cannot be avoided, as single stage Buck converters, by definition, must have an input voltage that is always higher than the output voltage of the converter (i.e., a positive voltage differential). However, as described further below, the undesirable effects of the interruption periods can be mitigated by using additional circuitry to reduce their duration.

Figure 3:
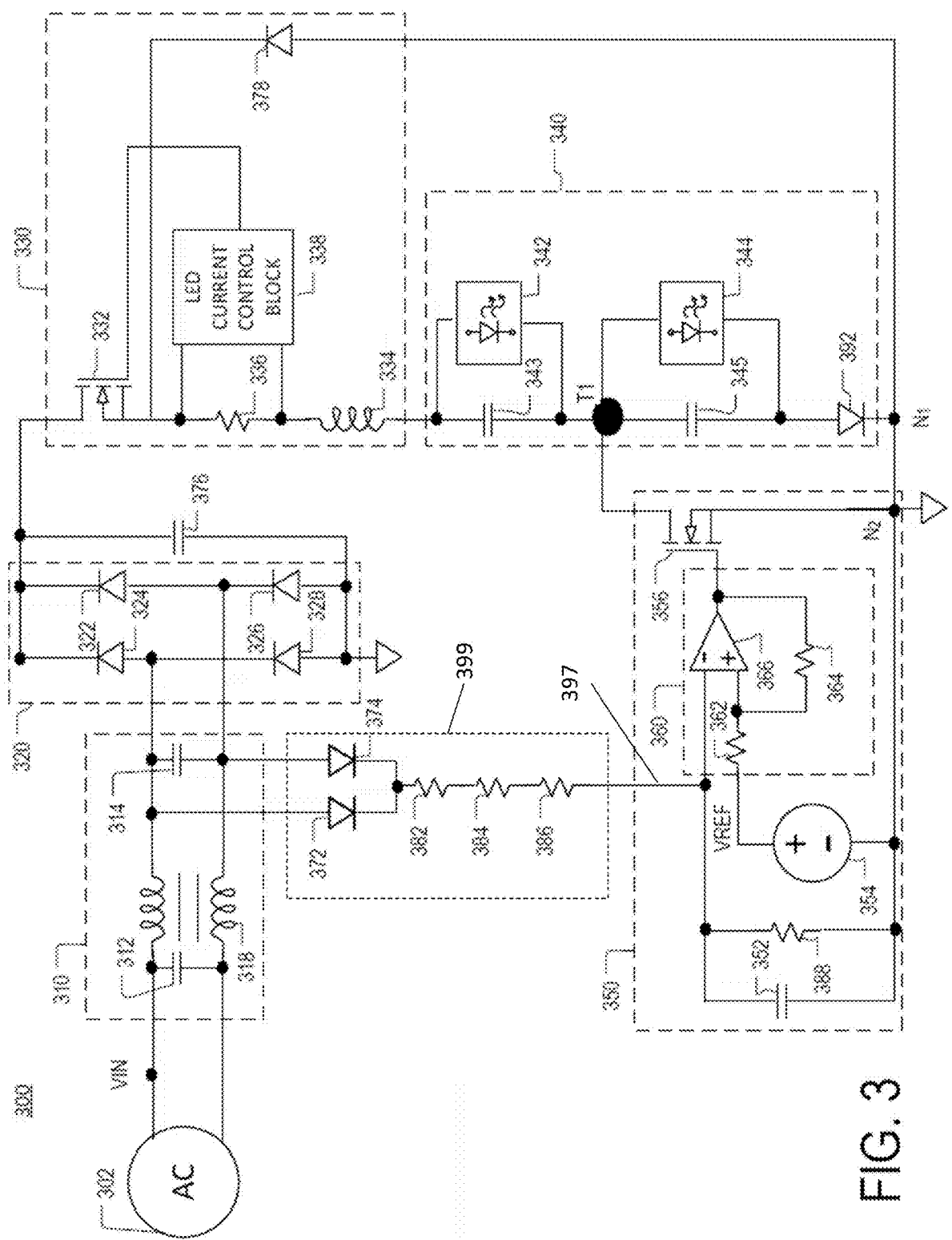
FIG. 3 is a diagram of another example of an LED driver circuit.

FIG. 3 is a diagram of another LED driver circuit 300. In the example illustrated in FIG. 3, the LED driver circuit 300 includes EMI filter 310, a rectifier circuit 320, a Buck converter circuit 330, a load section 340, a switching circuit 350 and an AC input voltage detecting circuit 399. The LED driver circuit 300 is configured to reduce the duration of interruption periods that occur when the Buck converter circuit 330 is used to drive a plurality of LEDs in the load section 340.

The load section 340 may include two or more strings of LED devices. In the example illustrated in FIG. 3, the load section 340 includes two strings of LED devices, a first string of LED devices 342 and a second string of LED devices 344. The reduction in the duration of the interruption periods may be achieved by applying the DC current to each of the two of more strings of LED devices in sequence based on the magnitude of instantaneous voltage that is being supplied to the LED driver circuit 300. This may reduce the load voltage on the Buck converter circuit 330 near zero crossings of the input voltage, enabling the Buck converter circuit 330 to conduct earlier and reducing the dead zones in the input current.

The electro-magnetic interference (EMI) filter 310 at the AC input to the LED driver circuit 300 may include capacitors 312 and 314 and a common mode inductor 318, as shown. The EMI filter 310 may receive the AC voltage VIN from an AC source 302 and output a filtered AC voltage to the rectifier circuit 320. The AC source 302 may include a municipal power main and/or any other suitable source of AC current. Additionally or alternatively, the AC source 302 may include a connector that is adapted to connect to an AC voltage source.

The rectifier circuit 320 may receive the filtered AC voltage from the EMI filter 310 at the AC input to the LED driver circuit 300 and supply a rectified DC voltage to the Buck converter circuit 330. The rectifier circuit 320 may be any suitable type of rectifier circuit. In the example illustrated in FIG. 3, the rectifier circuit 320 includes diodes 322, 324, 326, and 328, arranged as shown.

The Buck converter circuit 330 may be a single-stage Buck converter. The Buck converter circuit 330 may be the same or similar to the Buck converter circuit 130, which is discussed above with respect to FIG. 1. As illustrated, the Buck converter circuit 330 may include a switch 332, an inductor 334, a resistor 336, a current control block 338, and a diode 378. The switch 332 may be a MOSFET.

The current control block 338 may be coupled to the gate of the switch 322 as shown. The current control block 338 may be configured to intermittently turn the switch 332 on and off in accordance with a predetermined frequency. When the switch 332 is turned on, current flows through the inductor 334. During this period, the inductor 334 builds up its magnetic energy. When the switch 332 is turned off, the inductor 334 releases the magnetic energy to supply current to the load section 340 through the diode 378. The current across the load section 340 can be regulated to required levels by varying the switching pattern of the switch 332 by using the current control block 338. The current ripples due to high-frequency switching can be largely absorbed by capacitor 376 such that most of the ripples do not reach the AC input of the LED driver circuit 300 to cause EMC issues.

The load section 340 may include the first string of LED devices 342 coupled in parallel with a capacitor 343 and the second string of LED devices 344 coupled in parallel with a capacitor 345. The capacitors 343 and 345 may absorb high frequency current ripples and provide current to a corresponding one of the first and second strings of LED devices 342 and 344 to enable them to emit light during periods when the Buck converter circuit is not supplying them with current either because the diode 378 in the Buck converter circuit is not conducting or because the switching circuit 350 is by-passing one or more of the strings of LED devices.

Each of the strings of LED devices may include one or more LEDs coupled to one another in series, parallel or some combination of series and parallel. Each of the strings of LED devices 342 and 344 has an individual threshold voltage. In some embodiments, the strings of LED devices 342 and 344 will have the same individual threshold voltage, but in other embodiments, the threshold voltages of the strings of LED devices 342 and 344 will be different. In an example embodiment, the first string of LED devices 342 may have a threshold voltage of VLED1 (e.g., 30V) and the second string of LED devices 344 may have a threshold voltage VLED2 (e.g., 30V). The load section 340 may have a total threshold voltage that is equal to the sum of VLED1 and VLED2 (e.g., 60V).

The first string of LED devices 342 may be coupled to the second string of LED devices 344 at a tap point T1. Tap point T1 may be switched on and off by the switching circuit 350. When tap point T1 is switched on, the current output by the Buck converter circuit 330 flows along the path spanning between the tap point T1 and node N1. In other words, when the tap point T1 is switched on, the current output by the Buck converter circuit 330 flows across both the first and second strings of LED devices 342 and 344, and both the first and second strings of LED devices 342 and 344 are turned on as a result. When the tap point T1 is switched off, the current output by the Buck converter circuit 330 flow across the first string of LED devices 342 and then travels along the short conductive path spanning between tap point T1 and node N2 (hereinafter "short conductive path T1-N2") to bypass the second string of LED devices 344. In other words, when the tap point T1 is switched off, the current output by the Buck converter circuit 330 is diverted away from the second string of LED devices 344, and the second string of LED devices 344 does not place a load on the Buck converter circuit 330 as a result.

The switching circuit 350 may be configured to switch the tap point T1 on and off based on the magnitude of the instantaneous AC voltage VIN supplied by the AC source 302 at the AC input to the LED driver circuit 300. The switching circuit 350 may include a capacitor 352 coupled in parallel with a resistor 388 and a voltage source 354, as shown. Furthermore, the switching circuit 350 may include a switch 356 and a voltage comparator 360. The voltage comparator may have an output that is coupled to a gate or control terminal of the switch 356. In embodiments, the switch 356 may be a MOSFET.

The voltage comparator 360 may include a resistor 362, a feedback resistor 364, and an operational amplifier (hereinafter "opamp") 366. The inverting input of the opamp 366 may be coupled to the voltage source 354 via the resistor 362. The output terminal of the opamp 366 may be coupled to the opamp's 366 non-inverting input via the feedback resistor 364. As can be readily appreciated, the resistor 362 may set the input impedance of the non-inverting terminal of the opamp 366, as well as a hysteresis together with the feedback resistor 364.

In embodiments, the switching circuit 350 may be associated with a particular trip point. The trip point may be a particular value of the input AC voltage VIN at which the switching circuit 350 is configured to switch the tap point T1 on and off. By way of example, the trip point of the switching circuit 350 may equal the total threshold voltage of the load section 340. When the magnitude of the instantaneous AC voltage VIN is below the trip point of the switching circuit 350, the switching circuit 350 may cause the switch 356 to close the short conductive path T1-N2, effectively causing the current that is output by the Buck converter circuit 330 to bypass the light source 344. When the magnitude of the instantaneous AC voltage VIN is above the trip point of the switching circuit 350, the switching circuit 350 may cause the switch 356 to open the short conductive path T1-N2, causing the current output by the Buck converter circuit 330 to begin flowing across the light source 344.

The AC input voltage detecting circuit 399 may be electrically coupled at AC inputs to the LED driver circuit 300 (e.g., after the EMI filter 310) and before the rectifier circuit 320 to detect the instantaneous AC voltage at the AC input to the LED driver circuit 300. The AC input voltage detecting circuit 399 may include diodes 372 and 374 electrically coupled to a resistor divider that includes resistors 382, 384 and 386. The resistor divider including the resistors 382, 384 and 386 may be electrically coupled to an input 397 to the switching circuit 350.

In operation, diodes 372 and 374 may rectify the AC input voltage VIN into a DC voltage, which is sensed by the resistor divider including the resistor 382, the resistor 384, the resistor 386, and the resistor 388 in the switching circuit 350. The voltage across the resistor 388, which represents the instantaneous AC voltage VIN, may be filtered by capacitor 352 and used as the inverting input of the opamp 366. The voltage VREF, which may be output by the voltage source 354, may be a reference voltage coupled to the non-inverting input of the opamp 366. In some implementations, the reference voltage VREF and the divider ratio of resistor string including resistors 382, 384, 386 and 388 may be dimensioned such that the trip point of the switching circuit 350 is approximately equal the sum of the threshold voltage VLED1 of the first string of LED devices 342 and the threshold voltage VLED2 of the second string of LED devices 344. Additionally or alternatively, in some implementations, the reference voltage VREF and the divider ratio of resistor string including resistors 382, 384, 386 and 388 may be dimensioned such that the trip point of the switching circuit 350 is less than or equal to the sum of the threshold voltage VLED1 of the first string of LED devices 342 and the threshold voltage VLED2 of the second string of LED devices 344.

When the magnitude of the instantaneous AC voltage VIN is below the trip point of the opamp 366, the output produced by the opamp 366 may be high and the switch 356 may be turned on. When the magnitude of the instantaneous AC voltage VIN is above the trip point of the opamp 366, the output produced by the opamp 366 may be low and the switch 356 may be turned off. As can be readily appreciated, due to the diodes 372 and 374, the switching of the switch 356 may be at double the AC input frequency (e.g., 60 Hz in the example described above). When the switch 356 is switched on, the short conductive path T1-N2 is closed, the tap point T1 is turned off, and the current output from the Buck converter circuit 330 is diverted away from the light source 344.

According to embodiments, the diode 392 ensures that turning on the switch 356 provides a conductive path for the first string of LED devices 342 without short-circuiting the second string of LED devices 344 and/or the capacitor 345. This may enable the second string of LED devices 344 to emit light using current supplied by the capacitor 345 when the switch 356 is turned on to divert Buck converter circuit current away from the second string of LED devices 344. In some implementations, the diode 392 can be replaced by an active switching device that turns on when the switch 356 is off and turns off when the switch 356 is on. The latter approach may increase the efficiency of the LED driver circuit 300 at the expense of increased circuit complexity and increased manufacturing cost.

In some implementations, the voltage comparator 360 (or opamp 366) may be configured to operate the switch 356 in ohmic mode for increased efficiency. This is in contrast to traditional tapped linear drivers, which normally control their constituent taps by using MOSFETs that are operated in linear mode with more power dissipation.

Furthermore, it should be noted that in the LED driver circuit 300, output current control may be performed independently of the switching of taps in the load section 340. As illustrated above, in the LED driver circuit 300, output current control is performed by the current control block 338, which controls the rate and pattern at which the switch 332 is switched on and off. Because the switching circuit 350 switches the tap point T1 only during periods of low magnitude of the instantaneous AC voltage, it hardly affects the total value and the control of the output current. This, in turn, facilitates the use of the LED driver circuit 300 and/or the Buck converter circuit 330 together with various dimmer switches that are available on the market. As can be readily appreciated, if output current control and tap switching were performed co-dependently, the introduction of a dimmer switch could potentially require a more complicated output current control depending on the manner in which taps are switched.

Furthermore, as mentioned above, the AC input voltage detecting circuit 399 may be coupled to the AC input of the LED driver circuit 300 before the rectifier circuit 320. This, in turn, may allow the switching circuit 350 to switch the tap point T1 at precise points in the waveform of the input voltage VIN for optimum performance. Such precise switching might not be possible if the AC input voltage detecting circuit 399 were coupled after (or downstream from) the rectifier circuit 320 due to attenuation and/or distortion introduced by the rectifier circuit 320 and the capacitor 376. Notwithstanding, it should be noted that this is not limited to any specific position of the switching circuit 350, and the AC input voltage detecting circuit 399 may nonetheless be situated downstream from the rectifier circuit 320 in some implementations.

Figure 4:
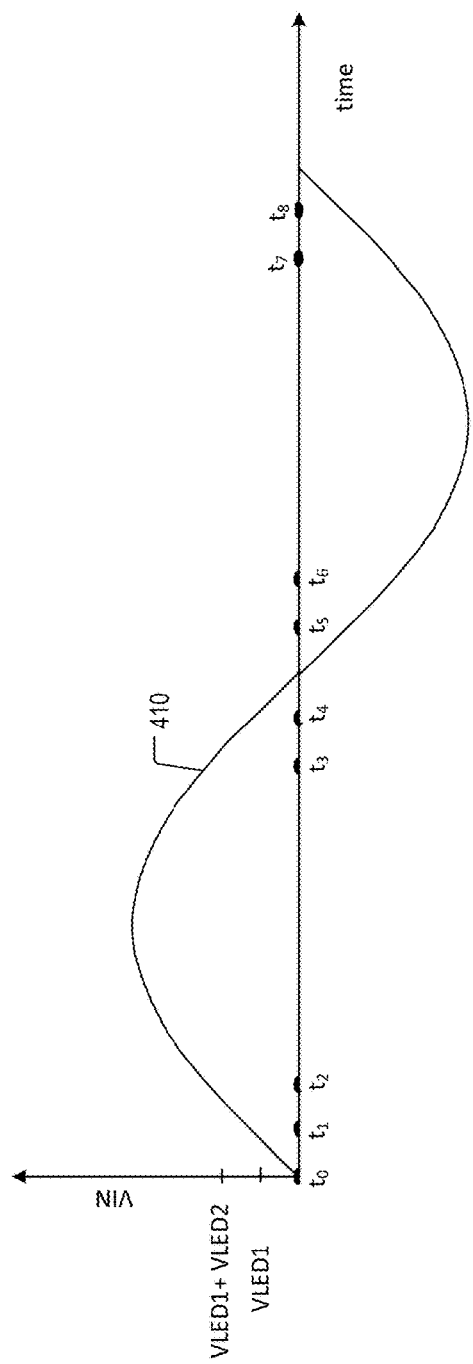
FIG. 4 is a graph illustrating an example of a voltage waveform that can be used to power the LED driver circuit of FIG. 3.
Figure 5:
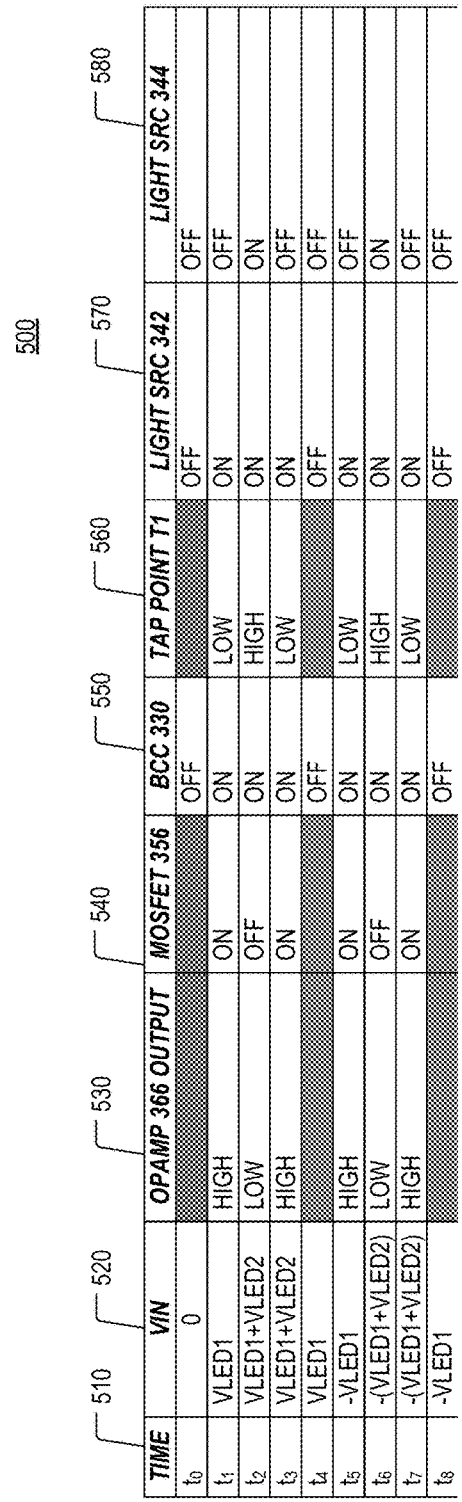
FIG. 5 is a table illustrating aspects of the operation of the LED driver circuit of FIG. 3.

The operation of the LED driver circuit 300 is described in further detail with reference to FIGS. 4 and 5. FIG. 4 is a graph of a waveform 410 of the AC voltage VIN at the AC input to the LED driver circuit 300. FIG. 5 shows a table 500 identifying the states undergone by the LED driver circuit 300 during each cycle of the waveform 410. The table 500 includes columns 510-580. Column 510 identifies a plurality of different time instants. Column 520 identifies the magnitude of the instantaneous AC voltage VIN at the AC input to the LED driver circuit 300 at each of the time instants of column 510. Column 530 identifies the state of the opamp 366 output at each of the time instants of column 510. Column 540 identifies the state of the switch 356 at each of the time instants of column 510. Column 550 identifies the state of the Buck converter circuit 330 at each of the time instants of column 510. Column 560 identifies the state of the tap point T1 at each of the time instants of column 510. Column 570 identifies the state of the first string of LED devices 342 at each of the time instants of column 510. Column 580 identifies the state of the second string of LED devices 344 at each of the time instants of column 510.

At time to, the magnitude of the instantaneous AC voltage VIN is zero, below the threshold voltage VLED1 of the first string of LED devices 342. As a result, the Buck converter circuit 330 is turned off. At this time, the state of the opamp 366 and the switch 356 is irrelevant because no current can be output from the Buck converter circuit 330. The first and second strings of LED devices 342 and 344 may be turned off, or alternatively, the first and second strings of LED devices 342 and 344 may be powered using energy stored in capacitors 343 and 345, respectively.

At time $t_1$, the magnitude of the instantaneous AC voltage VIN exceeds the threshold voltage VLED1 of the first string of LED devices 342. Furthermore, the opamp 366 output generates a high signal, which causes the switch 356 to be turned on to close the short conductive path T1-N2 and turn off the tap point T1. As a result, the Buck converter circuit 330 is turned on. At this time, the first string of LED devices 342 may be powered with current output from the Buck converter circuit 330. The second string of LED devices 344, on the other hand, may not receive the current generated by the Buck converter circuit 330, and it may be either turned off or powered using energy stored in the capacitor 345.

At time $t_2$, the magnitude of the instantaneous AC voltage VIN exceeds the sum of the threshold voltage VLED1 of the first string of LED devices 342 and the threshold voltage VLED2 of the second string of LED devices 344. In response, the opamp 366 output generates a low signal, and the switch 356 is turned off. When the switch 356 is turned off, the short conductive path T1-N2 is opened, allowing current supplied by the Buck converter circuit 330 to flow across the second string of LED devices 344. At this time, the tap point T1 is turned on and both of the first and second strings of LED devices 342 and 344 may be supplied with current that is output from the Buck converter circuit 330.

At time $t_3$, the magnitude of the instantaneous AC voltage VIN falls below the sum of the threshold voltage VLED1 of the first string of LED devices 342 and the threshold voltage VLED2 of the second string of LED devices 344, while still above the individual threshold voltage VLED1 of the first string of LED devices 342. In response, the opamp 366 output generates a high signal, which causes the switch 356 to be turned on to close the short conductive path T1-N2 and turn off the tap point T1. At this time, the first string of LED devices 342 may be powered with current output from the Buck converter circuit 330. The second string of LED devices 344, on the other hand, may not receive the current generated by the Buck converter circuit 330, and it may be either turned off or powered using energy stored in the capacitor 345.

At and after time $t_4$ and before time $t_5$, the magnitude of the instantaneous AC voltage VIN falls below the threshold voltage VLED1 of the first string of LED devices 342. As a result, the Buck converter circuit 330 is turned off. At this time, the state of the opamp 366 and the switch 356 is irrelevant because no current can be output from the Buck converter circuit 330. The first and second strings of LED devices 342 and 344 may be turned off, or alternatively, the first and second strings of LED devices 342 and 344 may be powered using energy stored in capacitors 343 and 345, respectively.

At time $t_5$, the magnitude of the instantaneous AC voltage VIN exceeds the individual threshold voltage VLED1 of the first string of LED devices 342. Furthermore, the opamp 366 output generates a high signal, which causes the switch 356 to be turned on to close the short conductive path T1-N2 and turn off the tap point T1. As a result, the Buck converter circuit 330 is turned on. At this time, the first string of LED devices 342 may be powered with current output from the Buck converter circuit 330. The second string of LED devices 344, on the other hand, may not receive the current generated by the Buck converter circuit 330, and it may be either turned off or powered using energy stored in the capacitor 345.

At time $t_6$, the magnitude of the instantaneous AC voltage VIN exceeds the sum of the threshold voltage VLED1 of the first string of LED devices 342 and the threshold voltage VLED2 of the second string of LED devices 344. In response, the opamp 366 output generates a low signal, and the switch 356 is turned off. When the switch 356 is turned off, the short conductive path T1-N2 is opened, allowing current supplied by the Buck converter circuit 330 to flow across the second string of LED devices 344. At this time, the tap point T1 is turned on and both of the first and second strings of LED devices 342 and 344 may be supplied with current that is output from the Buck converter circuit 330.

At time $t_7$, the magnitude of the instantaneous AC voltage VIN falls below the sum of the threshold voltage VLED1 of the first string of LED devices 342 and the threshold voltage VLED2 of the second string of LED devices 344, while still above the individual threshold voltage VLED1 of the first string of LED devices 342. In response, the opamp 366 output generates a high signal, which causes the switch 356 to be turned on to close the short conductive path T1-N2 and turn off the tap point T1. At this time, the first string of LED devices 342 may be powered with current output from the Buck converter circuit 330. The second string of LED devices 344, on the other hand, may not receive the current generated by the Buck converter circuit 330, and it may be either turned off or powered using energy stored in the capacitor 345.

At and after time $t_8$, the magnitude of the instantaneous AC voltage VIN falls below the threshold voltage VLED1 of the first string of LED devices 342. As a result, the Buck converter circuit 330 is turned off. At this time, the state of the opamp 366 and the switch 356 is irrelevant because no current can be output from the Buck converter circuit 330. The first and second strings of LED devices 342 and 344 may be turned off, or alternatively, the first and second strings of LED devices 342 and 344 may be powered using energy stored in capacitors 343 and 345, respectively.

Figure 6:
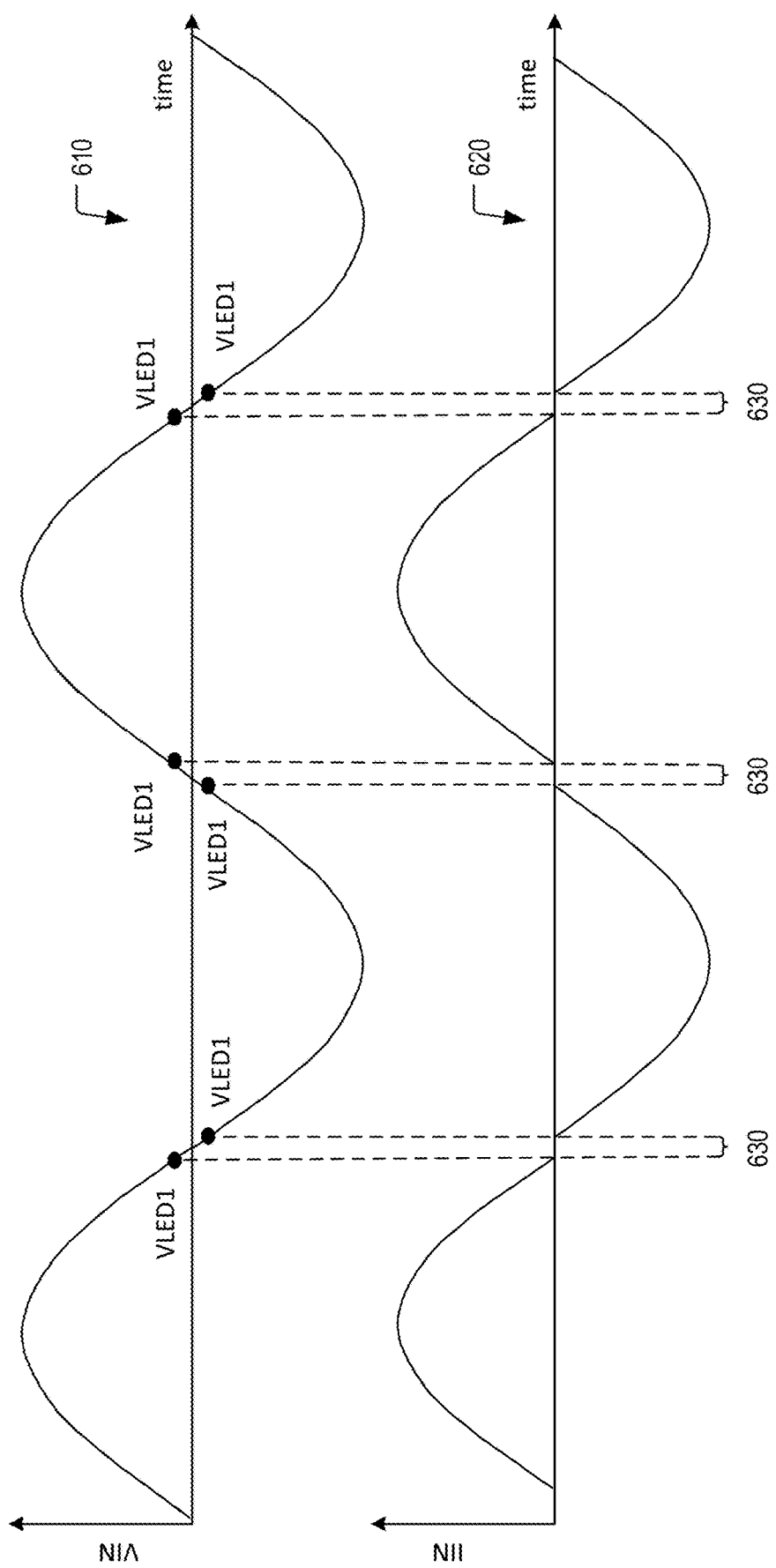
FIG. 6 is graph illustrating aspects of the operation of the LED driver circuit of FIG. 3.

FIG. 6 is a graph showing plots 610 and 620, which illustrate a pattern at which interruption periods 630 occur during normal operation of the LED driver circuit 300. Plot 610 shows the input AC voltage VIN at the AC input to the LED driver circuit 300 as a function of time. Plot 620 shows the input current IIN at the AC input to the LED driver circuit 300. As illustrated by the plot 620, the flow of the input current IIN is interrupted during interruption periods 630. However, because the LED driver circuit 300 utilizes a switching circuit 350 to dynamically disconnect the second string of LED devices 344 from the Buck converter circuit 330 when the magnitude of the instantaneous AC voltage VIN is too low to power both of the strings of LED devices 342 and 344, the duration of the interruption periods 630 of the LED driver circuit 300 is twice as short as the duration of the interruption periods 230 of the LED driver circuit 100, as illustrated in FIG. 2 and described above. As a result, at 120V/60 Hz input, the total harmonic distortion (THD) of input current may be approximately 20% for the LED driver circuit 100 and approximately 11% for the LED driver circuit 300. This reduction in THD is significant, and it could make practical the use of single-stage Buck converter circuits to drive LED lighting systems that require a high quality of both input current and light output.

Figure 7:
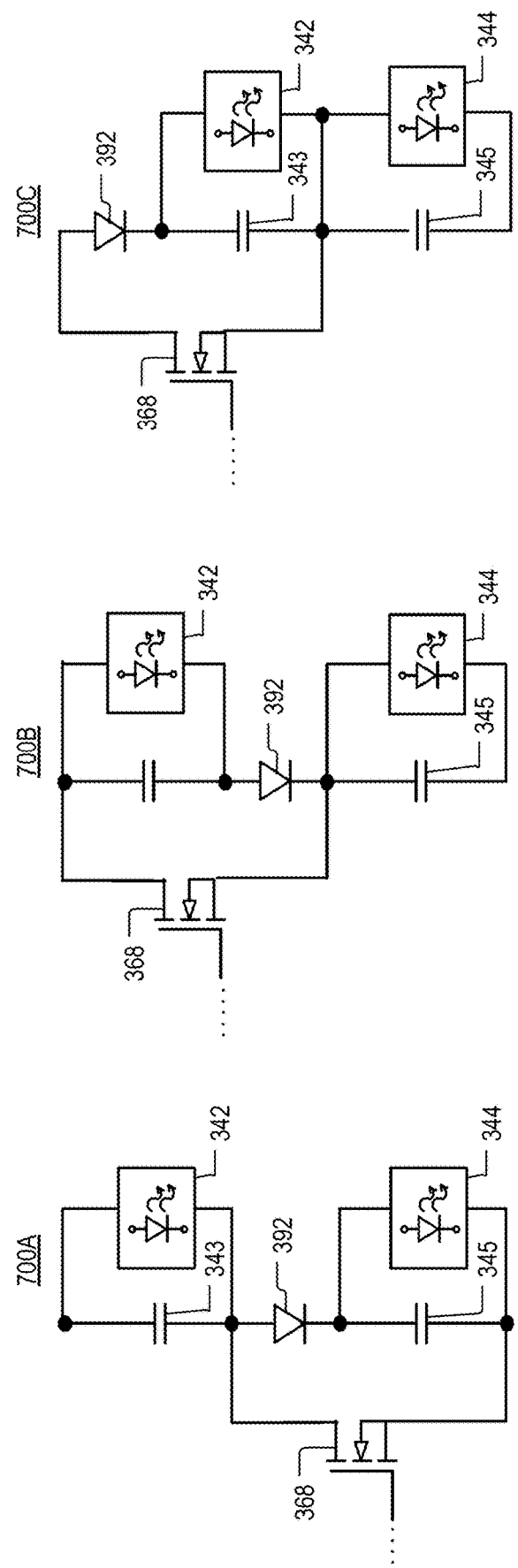
FIG. 7A is a diagram of an example of a load section that can be substituted into the LED driver circuit of FIG. 3.
FIG. 7B is a diagram of another example of a load section that can be substituted into the LED driver circuit of FIG. 3.
FIG. 7C is a diagram of yet another example of a load section that can be substituted into the LED driver circuit of FIG. 3.

FIG. 7A is a diagram illustrating an example a load section 700A that can be used to replace the load section 340 of the LED driver circuit 300 in some embodiments. In the example illustrated in FIG. 7A, the load section 700A includes the first string of LED devices 342 electrically coupled in parallel with the capacitor 343 and the second string of LED devices 344 electrically coupled in parallel with the capacitor 345. The diode 392 may be disposed between the first and second strings of LED devices 342 and 344. The switch 368 may be coupled in parallel with the diode 392 and the second string of LED devices 344, as shown.

FIG. 7B is a diagram illustrating another example of a load section 700B that can be used to replace the load section 340 of the LED driver circuit 300. In the example illustrated in FIG. 7B, the load section 700B includes the first string of LED devices 342 electrically coupled in parallel with the capacitor 343 and the second string of LED devices 344 electrically coupled in parallel with the capacitor 345. The diode 392 may be disposed between the first and second strings of LED devices 342 and 344. The switch 368 may be coupled in parallel with the diode 392 and the first string of LED devices 342, as shown.

FIG. 7C is a diagram illustrating another example a load section 700C that can be used to replace the load section 340 of the LED driver circuit 300. In the example illustrated in FIG. 7C, the load section 700C includes the first string of LED devices 342 electrically coupled in parallel with the capacitor 343 and the second string of LED devices 344 electrically coupled in parallel with the capacitor 345. The diode 392 may be disposed upstream from both of the first and second strings of LED devices 342 and 344. The switch 368 may be coupled in parallel with the diode 392 and the first string of LED devices 342, as shown.

Figure 8:
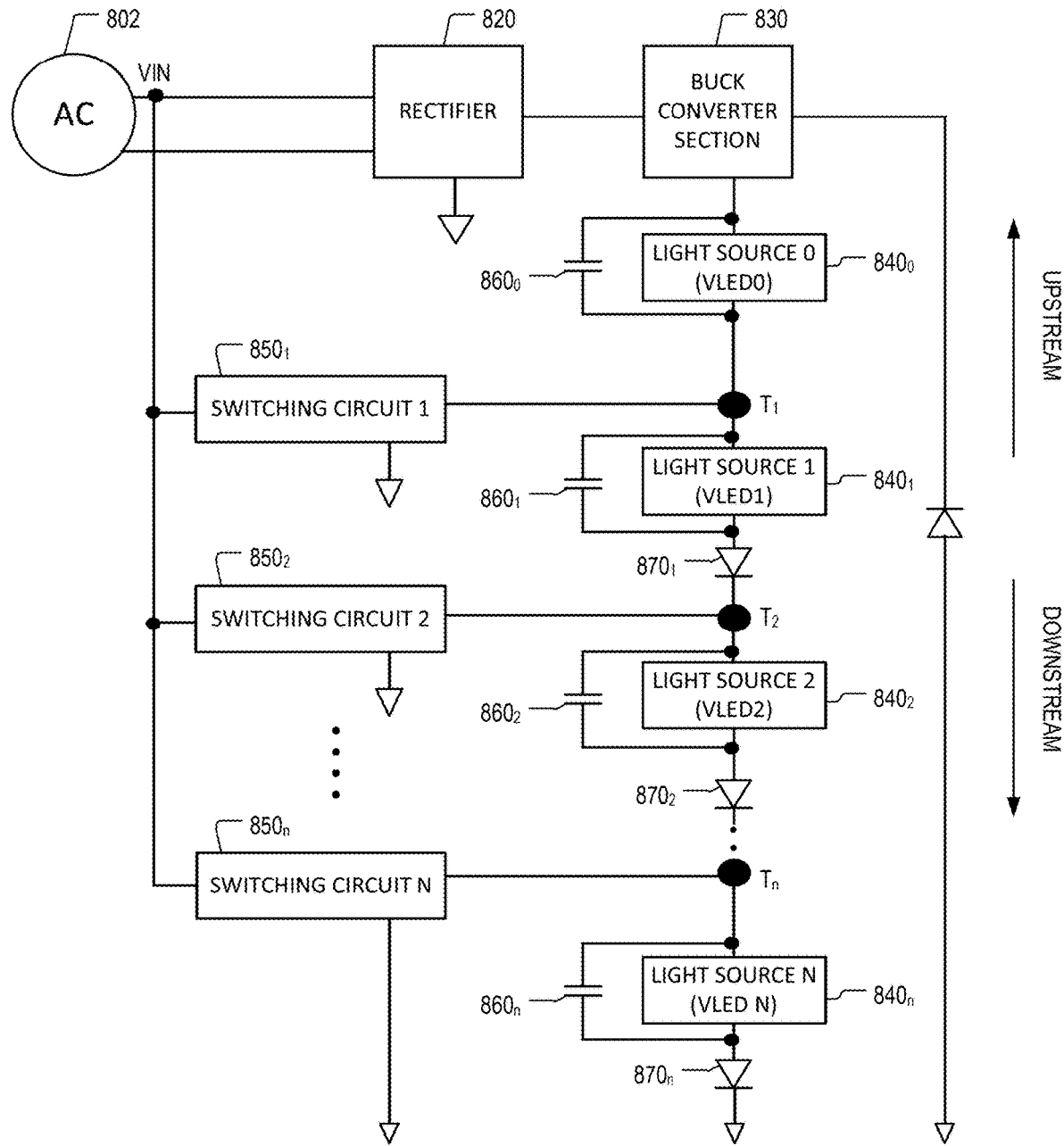
FIG. 8 is a diagram of yet another example of an LED driver circuit.

FIG. 8 is a diagram of an example of an LED driver circuit 800. The LED driver circuit 800 is similar to the LED driver 300. FIG. 8 is provided to illustrate that the concept of the LED driver circuit 300 can be extended to circuits that include multiple tap points $T_{1-n}$, multiple switching circuits $850_{1-n}$, and more than two strings of LED devices $840_{1-n}$.

As illustrated, the LED driver circuit 800 may include an AC input electrically coupled to receive an AC current from an AC source 802, a rectifier circuit 820, a Buck converter circuit 830, a plurality of strings of LED devices $840_{0-n}$, and a plurality of switching circuits $850_{1-n}$, wherein n is any positive integer. The AC source 802 may be the same or similar to the AC source 302 of the LED driver circuit 300. The rectifier circuit 820 may be the same or similar to the rectifier circuit 320 of the LED driver circuit 300. The Buck converter circuit 830 may be the same or similar to Buck converter circuit 330 of the LED driver circuit 300. The strings of LED devices $840_{0-n}$ may be LED-based light sources. Each of the light strings of LED devices $840_{0-n}$ may be the same or similar to any of the strings of LED devices 342 and 344. Each string of LED devices $840_i$ may have a respective individual threshold voltage $VLED_i$, wherein $0 \leq i \leq n$. For example, the string of LED devices (e.g., first string of LED devices) $840_0$ may have an individual threshold voltage $VLED_0$, the string of LED devices $840_1$ (e.g., second string of LED devices) may have an individual threshold voltage $VLED_1$, the string of LED devices $840_2$ (e.g., third string of LED devices) may have an individual threshold voltage $VLED_2$, and the string of LED devices $840_n$ (e.g., nth string of LED devices) may have an individual threshold voltage $VLED_n$.

The n strings of LED devices $840_{1-n}$ may be coupled to one another via tap points $T_{1-n}$. Each of the n strings of LED devices $840_{1-n}$ may be coupled in parallel with a respective capacitor $860_{1-n}$ that is configured to absorb high-frequency current ripples. In addition, each of the n strings of LED devices $840_{1-n}$ may be coupled in series with a respective diode $870_{1-n}$. As discussed above, in some implementations, each diode $870_i$ may be replaced with a switching device that is configured to be turned off when the respective tap $T_i$ is turned off.

Except for the first string of LED devices $840_0$, each string of LED devices $840_k$ may be coupled to the Buck converter circuit 830 via a respective tap point $T_k$ that is situated immediately upstream from the kth string of LED devices $840_k$, wherein $1 \leq k \leq n$. Each tap point $T_k$ may be switched on and off by a respective switching circuit $850_k$. When any given tap point $T_k$ is switched on, current supplied by the Buck converter circuit 830 is routed across the kth string of LED devices $840_k$. When any given tap point $T_k$ is switched off, current supplied by the Buck converter circuit 830 is diverted over a short conductive path, such as the path T1-N2 described above with respect to FIG. 3, to bypass the kth string of LED devices $840_k$ and all remaining strings of LED devices $840_{(k+1)-n}$ that are situated downstream from the kth string of LED devices $840_k$. When any given tap point $T_k$ is switched off, the kth string of LED devices $840_k$ and all remaining light sources $840_{(k+1)-n}$ that are situated downstream from the kth string of LED devices $840_k$ may not be powered with current supplied by the Buck converter circuit 830 and may not place a load on the Buck converter circuit 830, but may be powered using energy stored in capacitors $860_{0-n}$.

In some implementations, each switching circuit $850_k$ may be the same or similar to the switching circuit 350 of the LED driver circuit 300. Each switching circuit $850_k$ may be configured to switch off its corresponding tap point $T_k$ when the magnitude of the instantaneous AC voltage VIN is less than (or equal) to a trip point $TP_k$ corresponding to the switching circuit $850_k$. Additionally or alternatively, each switching circuit $850_k$ may be configured to switch on its corresponding tap point $T_k$, when the magnitude of the instantaneous AC voltage VIN is greater than (or equal) to a trip point $TP_k$ corresponding to the switching circuit $850_k$.

The trip point of any switching circuit $850_k$ may be less than or equal to the sum of the individual voltage threshold of the kth string of LED devices $840_k$ and the individual voltage thresholds of all strings of LED devices that are situated upstream from the tap point $T_k$ that is associated with the switching circuit $850_k$. In some implementations, the trip point $TP_k$ of any switching circuit $850_k$ may be calculated using Equation 1 below:

$$TP_k \leq \Sigma_{i=0}^{k} VLEDL_i \qquad \text{(Eq. 1)}$$

Figure 9:
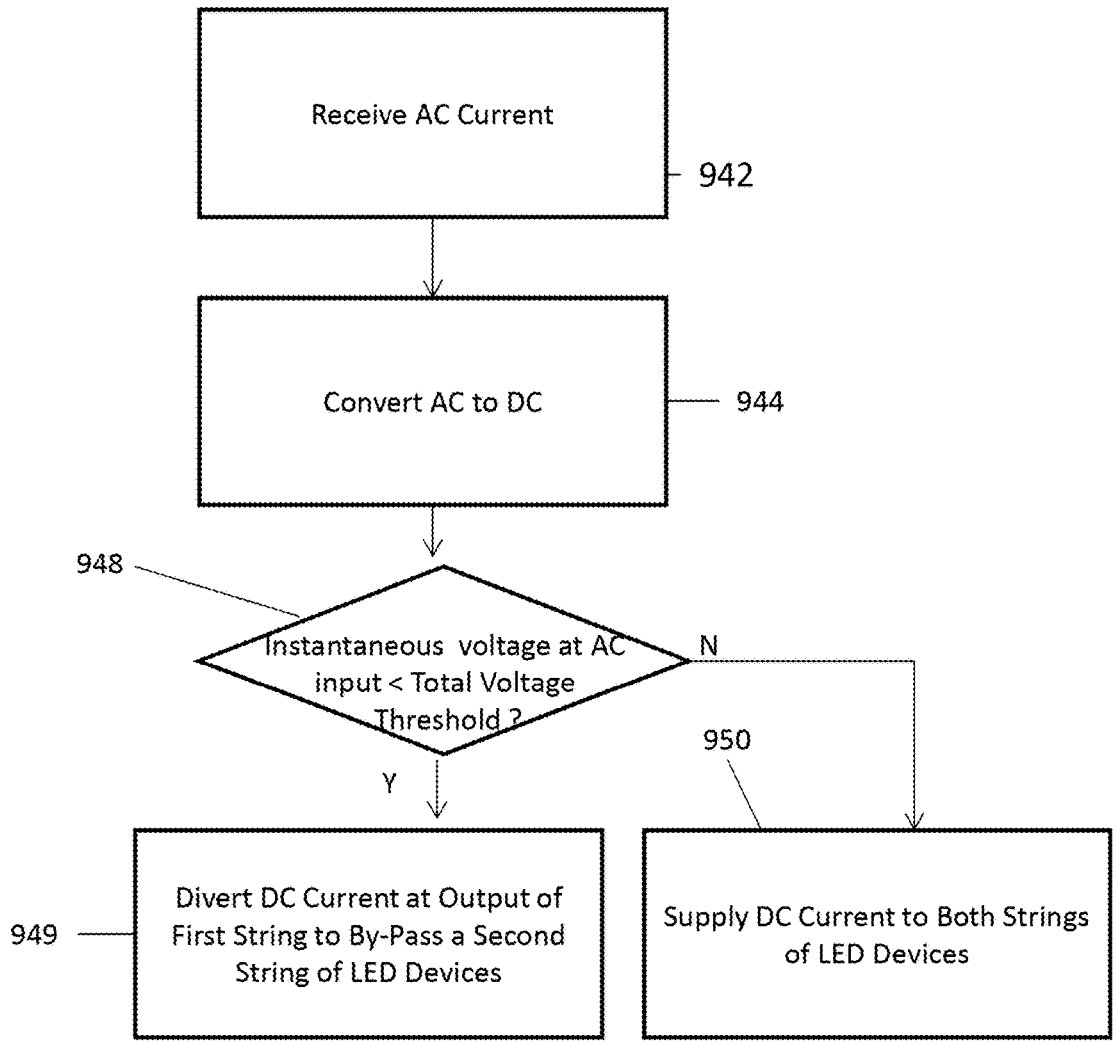
FIG. 9 is a flow diagram of an example method of operating an LED driver circuit.

FIG. 9 is a flow diagram 940 of an example method of operating an LED driver circuit. In the example illustrated in FIG. 9, the method includes receiving an AC current (942). The AC current may be received at an input to a single stage AC to DC converter. The AC current may be converted to DC current (944). The first string of LED devices may be electrically coupled in series with at least one other string of LED devices. At decision block 948, it may be determined whether the instantaneous voltage at an AC input to the LED driver circuit is less than a total threshold voltage of the first string of LED devices and the at least one other string of LED devices. On a condition that the instantaneous voltage at an AC input to the LED driver circuit is less than a total threshold voltage, the DC current at an output of the first string of LED devices may be diverted to by-pass the at least one other string of LED devices (949). Otherwise, the DC current may be provided to both the first string and the at least one other string of LED devices (950). As mentioned generally above, the steps illustrated in this flow diagram can include more steps not explicitly shown in this figure.

In embodiments, the diverting the DC current may further include diverting the DC current on a condition that the instantaneous voltage level at the AC input is between a voltage threshold of the first string of LED devices and the total voltage threshold of the first string of LED devices and the at least one other string of LED devices. The method may further include applying the current to all of the first string of LED devices and the at least one other string of LED devices on a condition that the instantaneous voltage level at the AC input is greater than the total voltage threshold of the first string of LED devices and the at least one other string of LED devices.

Figure 10:
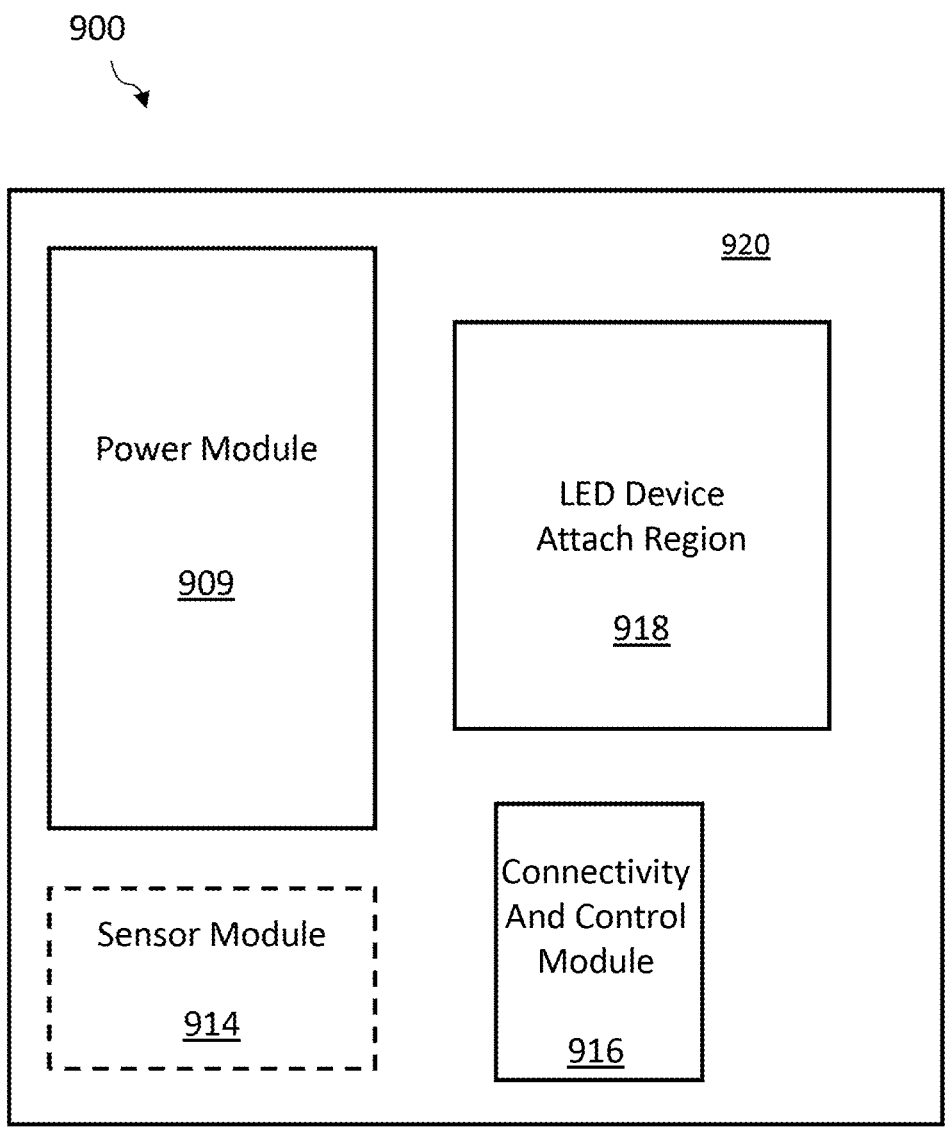
FIG. 10 is a top view of an electronics board for an integrated LED lighting system according to one embodiment.

FIG. 10 is a top view of an electronics board 900 for an integrated LED lighting system according to one embodiment. In alternative embodiments, two or more electronics boards may be used for the LED lighting system. For example, the LED array may be on a separate electronics board, or the sensor module may be on a separate electronics board. In the illustrated example, the electronics board 900 includes a power module 909, a sensor module 914, a connectivity and control module 916 and an LED attach region 918 reserved for attachment of an LED array to a substrate 920.

The substrate 920 may be any board capable of mechanically supporting, and providing electrical coupling to, electrical components, electronic components and/or electronic modules using conductive connecters, such as tracks, traces, pads, vias, and/or wires. The substrate 920 may include one or more metallization layers disposed between, or on, one or more layers of non-conductive material, such as a dielectric composite material. The power module 909 may include electrical and/or electronic elements. In an example embodiment, the power module 909 includes any of the LED driver circuits described herein and a dimming circuit.

The sensor module 914 may include sensors needed for an application in which the LED array is to be implemented. Example sensors may include optical sensors (e.g., IR sensors and image sensors), motion sensors, thermal sensors, mechanical sensors, proximity sensors, or even timers.

By way of example, LEDs in street lighting, general illumination, and horticultural lighting applications may be turned off/on and/or adjusted based on a number of different sensor inputs, such as a detected presence of a user, detected ambient lighting conditions, detected weather conditions, or based on time of day/night. This may include, for example, adjusting the intensity of light output, the shape of light output, the color of light output, and/or turning the lights on or off to conserve energy. For AR/VR applications, motion sensors may be used to detect user movement. The motion sensors themselves may be LEDs, such as IR detector LEDs. By way of another example, for camera flash applications, image and/or other optical sensors or pixels may be used to measure lighting for a scene to be captured so that the flash lighting color, intensity illumination pattern, and/or shape may be optimally calibrated. In alternative embodiments, the electronics board 910 does not include a sensor module.

The connectivity and control module 916 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules. The microcontroller may be any type of special purpose computer or processor that may be embedded in an LED lighting system and configured or configurable to receive inputs from the wired or wireless module or other modules, devices or systems in the LED lighting system (such as sensor data and data fed back from an LED array attached at the LED device attach region 918) and provide control signals to other modules based thereon. Algorithms implemented by the special purpose processor may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off the electronics board 910.

The term module, as used herein, may refer to electrical and/or electronic components disposed on individual electronics boards that may be soldered to one or more electronics boards 910. The term module may, however, also refer to electrical and/or electronic components that provide similar functionality, but which may be individually soldered to one or more electronics boards in a same region or in different regions.

Figure 11:
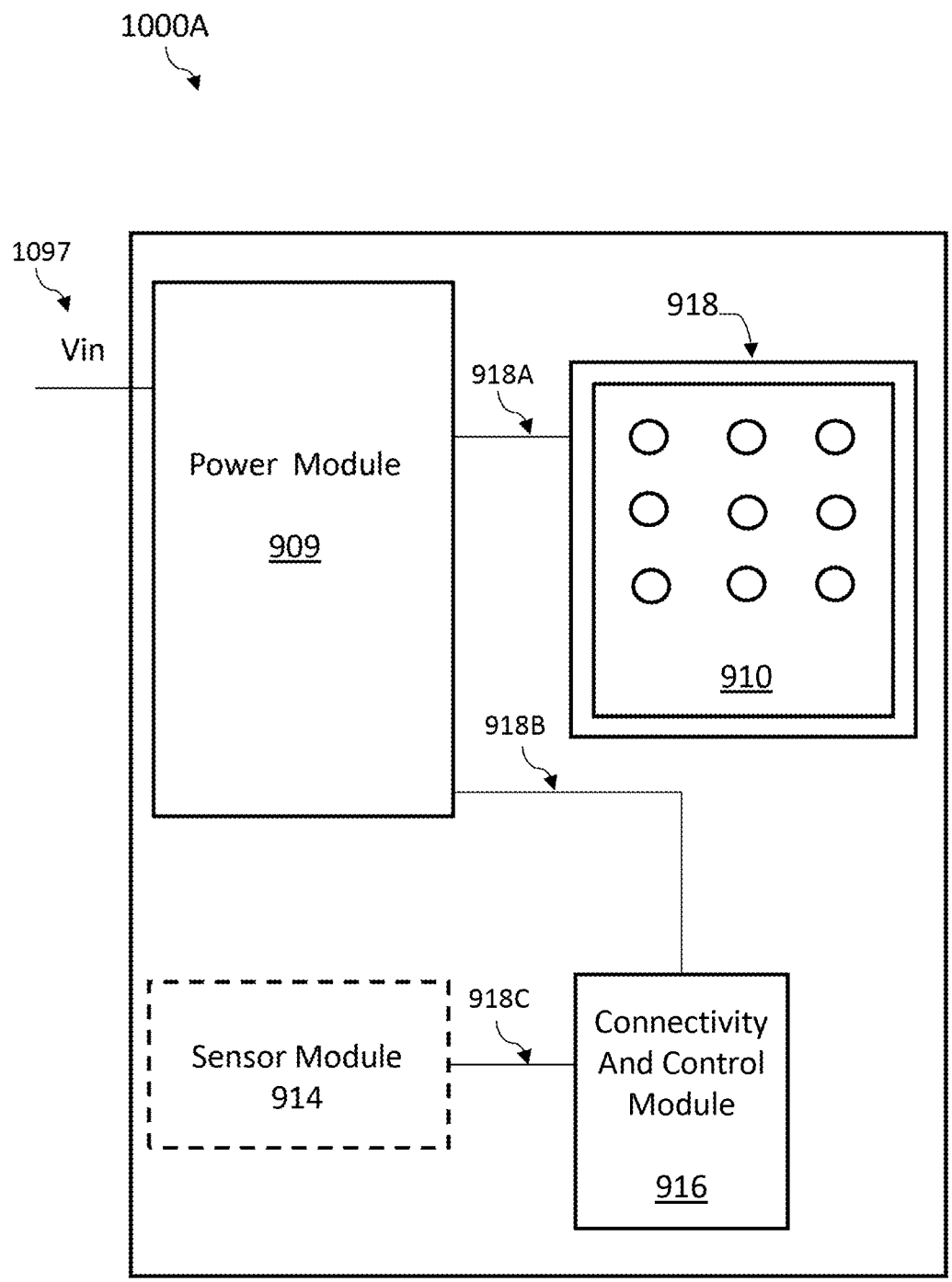
FIG. 11 is a top view of the electronics board with LED array attached to the substrate at the LED device attach region in one embodiment.

FIG. 11 is a top view of an integrated LED lighting system 1000A that includes an electronics board with an LED array 910 attached at the LED device attach region 918 in one embodiment. In the illustrated example, the power module 909 receives an AC voltage input at Vin 1097 and control signals from the connectivity and control module 916 one or more over traces 918B, and provides drive signals to the LED array 910 over one or more traces 918A. The LED array 910 is turned on and off via the drive signals from the power module 909. In the embodiment shown in FIG. 11, the connectivity and control module 916 receives sensor signals from the sensor module 914 over one or more traces 918C.

Figure 12:
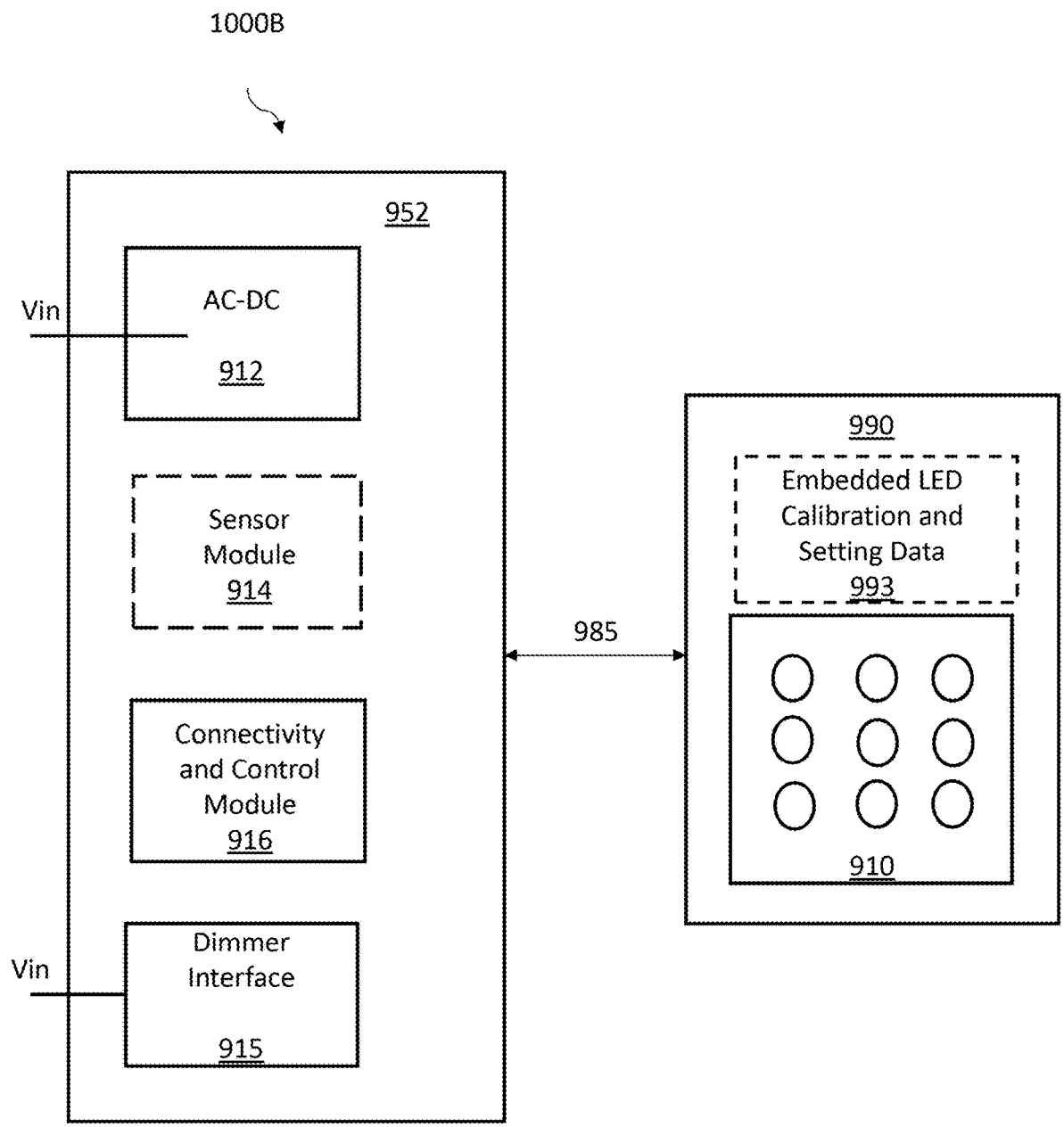
FIG. 12 is a diagram of an embodiment of an LED lighting system where the LED array is on a separate electronics board from the driver and control circuitry.

FIG. 12 is a block diagram of an embodiment of an LED lighting system 1000B where the LED array is on a separate electronics board from the driver and control circuitry. The LED lighting system 1000B includes a power module 952 that is on a separate electronics board than an LED module 990. The power module 952 may include, on a first electronics board, a single stage AC-DC converter circuit 912 such as described herein, a sensor module 914, a connectivity and control module 916, and a dimmer interface circuit 915. The LED module 990 may include, on a second electronics board, embedded LED calibration and setting data 993 and the LED array 910. Data, control signals and/or LED drive signals 985 may be exchanged between the power module 952 and the LED module 990 via wires that may electrically and communicatively couple the two modules.

The embedded LED calibration and setting data 993 may include any data needed by other modules within a given LED lighting system to control how the LEDs in the LED array are driven. In one embodiment, the embedded calibration and setting data 993 may include data needed by the system microcontroller to generate or modify a control signal that instructs the power module to provide power to multiple group of LEDs A and B in the case of multiple channel driving using, for example, pulse width modulated (PWM) signals. In this example, the calibration and setting data 993 may inform the system microcontroller as to, for example, the number of power channels to be used, a desired color point of the composite light to be provided by the entire LED array 910, and/or a percentage of the power provided by the AC-DC converter circuit 912 to provide to each channel.

Figure 13:
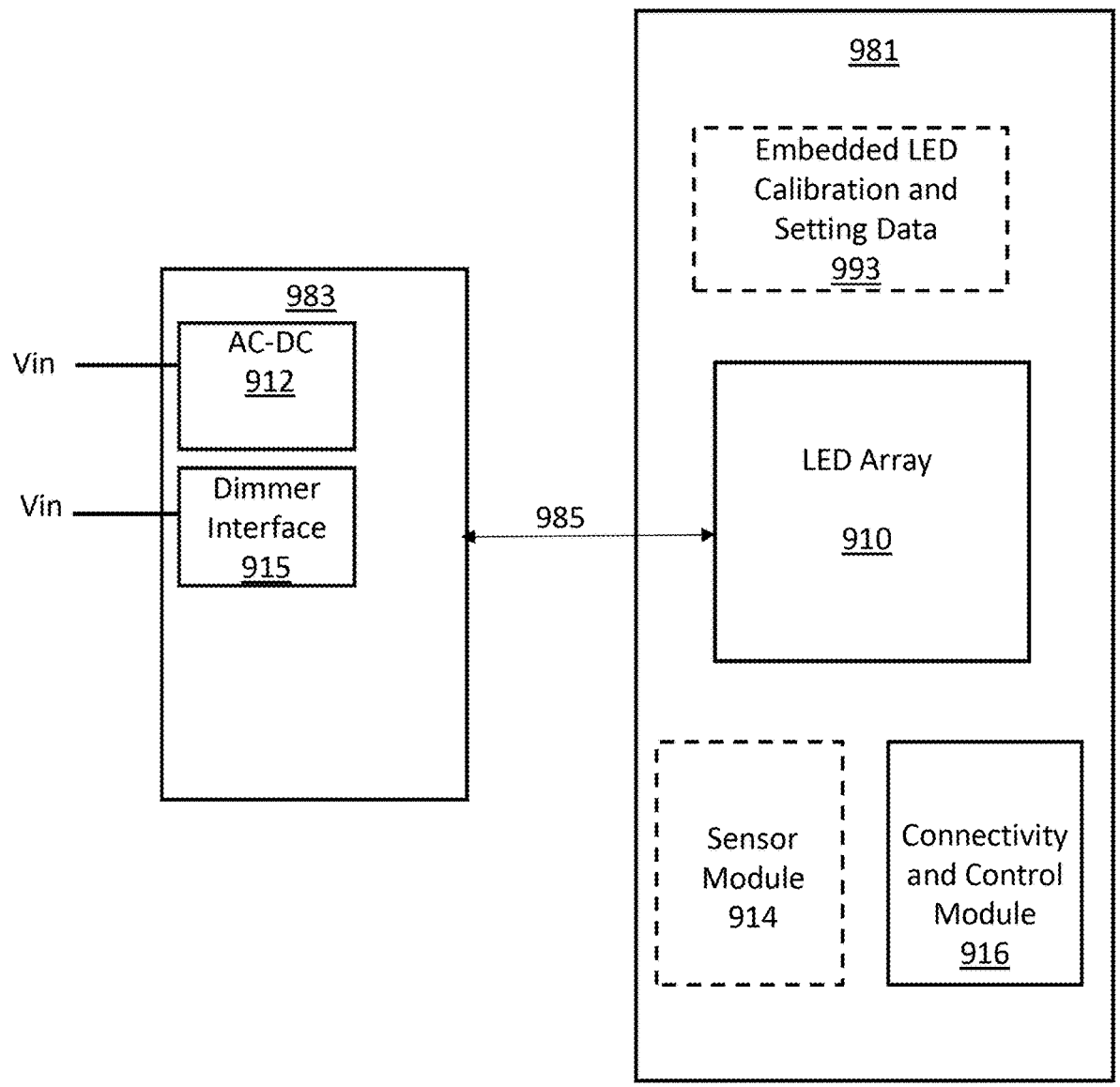
FIG. 13 is a block diagram of an LED lighting system having the LED array together with some of the electronics on an electronics board separate from the driver circuit.

FIG. 13 is a block diagram of an LED lighting system 1000C having the LED array together with some of the electronics on an electronics board separate from a power conversion module. The LED lighting system 1000C includes a power conversion module 983 and an LED module 981 located on a separate electronics board. The power conversion module 983 may include a single stage AC-DC converter circuit 912, such as described herein, and the dimmer interface circuit 915, and the LED module 981 may include the embedded LED calibration and setting data 993, LED array 910, sensor module 914 and connectivity and control module 916. The power conversion module 983 may provide LED drive signals 985 to the LED array 910 via a wired connection between the two electronics boards.

In some embodiments, the power modules 909, 952 and 983, which may include any of the LED driver circuits described herein, may provide a drive current to LED devices in the LED array 910 via a single channel. However, one of ordinary skill in the art will recognize that the LED driver circuits described herein may be used to provide two or more channel driving, such as by splitting a single channel into multiple channels or by inclusion of multiple LED driver circuits to provide multiple channels driving.

Figure 14:
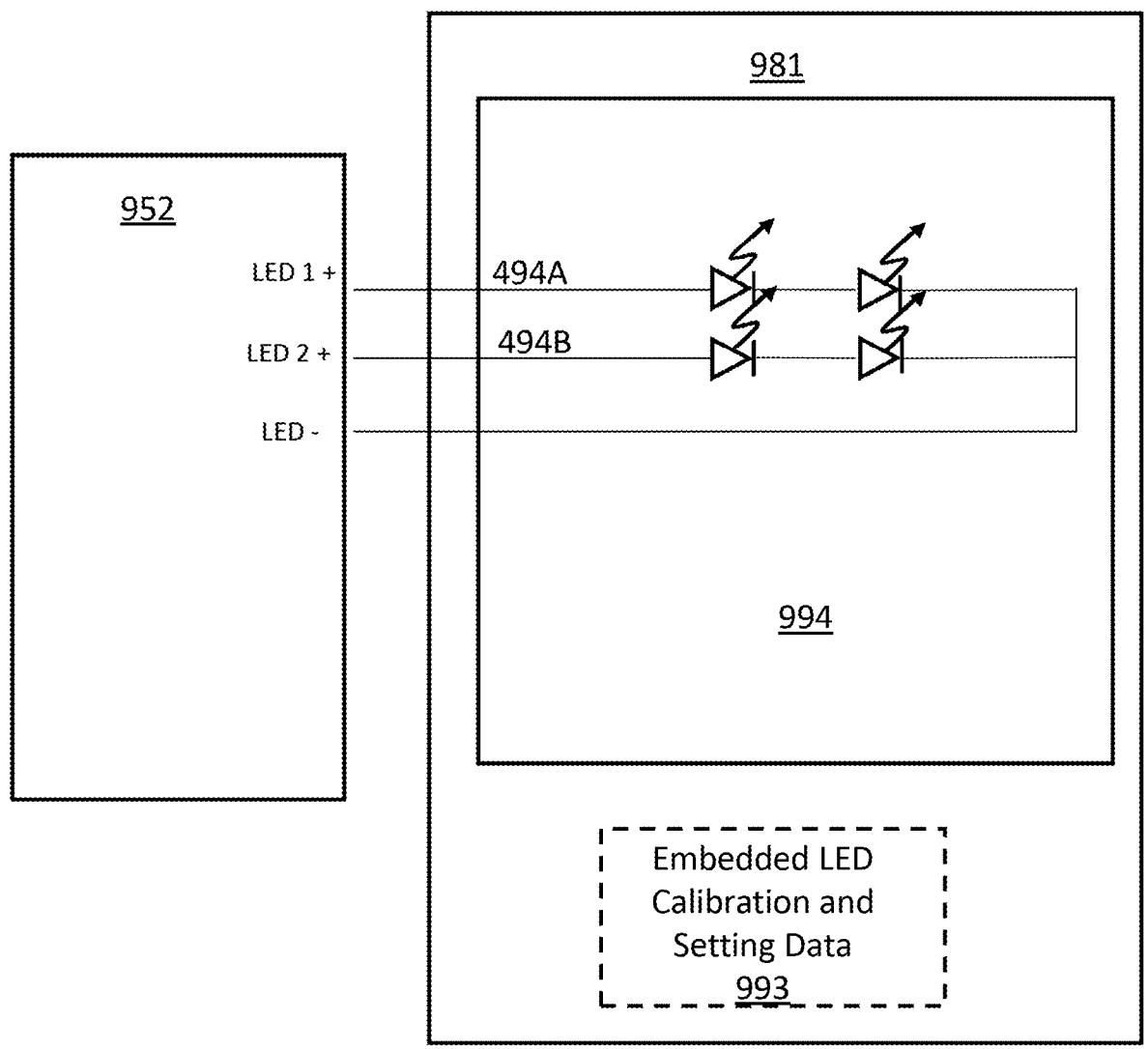
FIG. 14 is a diagram of example LED lighting system showing a multi-channel LED driver circuit.

FIG. 14 is a diagram of an example LED lighting system 1000D showing a multi-channel power module. In the illustrated example, the system 1000D includes a power module 952 and an LED module 981 that includes the embedded LED calibration and setting data 993 and two groups of LEDs 494A and 494B. While two groups of LEDs are shown in FIG. 14, one of ordinary skill in the art will recognize that any number of groups of LEDs may be used consistent with the embodiments described herein. Further, while the individual LEDs within each group are arranged in series, they may be arranged in parallel in some embodiments.

The LED array 981 may include groups of LEDs that provide light having different color points. For example, the LED array 981 may include a warm white light source via a first group of LEDs 994A and a cool white light source via a second group of LEDs 994B. In embodiment, a neutral white light source may be provided via a third group of LEDs (not shown). The warm white light source via the first group of LEDs 494A may include one or more LEDs that are configured to provide white light having a correlated color temperature (CCT) of approximately 2700K. The cool white light source via the second group of LEDs 494B may include one or more LEDs that are configured to provide white light having a CCT of approximately 6500K. While various white colored LEDs are described in this example, one of ordinary skill in the art will recognize that other color combinations are possible consistent with the embodiments described herein to provide a composite light output from the LED array 981 that has various overall colors.

The power module 952 may include a tuning circuit (not shown), which may be configured to supply power to the LED array 981 over two separate channels (indicated as LED1+ and LED2+ in FIG. 14). More particularly, tuning circuit may be configured to supply a first PWM signal to the first group of LEDs 494A such as warm white light source via a first channel and a second PWM signal to the second group of LEDs 494B via a second channel. Each signal provided via a respective channel may be used to power the corresponding LED or group of LEDs, and the duty cycle of the signal may determine the overall duration of on and off states of each respective LED. The duration of the on and off states may result in an overall light effect that may have light properties (e.g., correlated color temperature (CCT), color point or brightness) based on the duration. In operation, the tuning circuit may change the relative magnitude of the duty cycles of the first, second and third signals to adjust the respective light properties of each of the groups of LEDs to provide a composite light with the desired emission from the LED array 981. As noted above, the light output of the LED array 981 may have a color point that is based on the combination (e.g., mix) of the light emissions from each of the groups of LEDs 494A and 494B.

In operation, the power module 952 may receive a control input generated based on user and/or sensor input and provide signals via the individual channels to control the composite color of light output by the LED array 981 based on the control input. In some embodiments, a user may provide input to the LED system for control of the AC-DC converter circuit by turning a knob or moving a slider that may be part of, for example, a sensor module (not shown). Additionally or alternatively, in some embodiments, a user may provide input to the LED lighting system 1000D using a smartphone and/or other electronic device to transmit an indication of a desired color to a wireless module (not shown).

Figure 15:
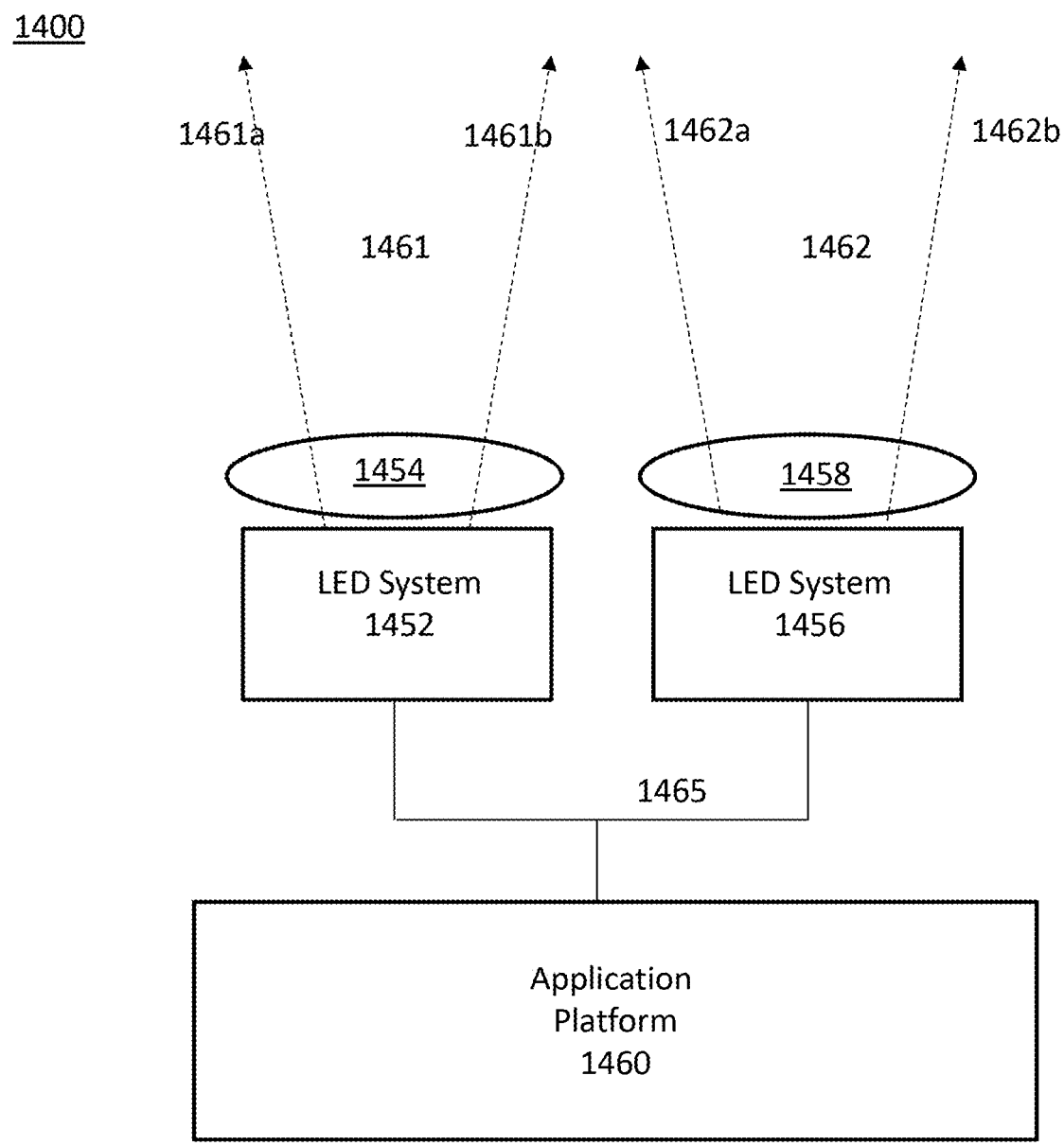
FIG. 15 is a diagram of an example application system.

FIG. 15 shows an example system 1400, which includes an application platform 1460, LED lighting systems 1452 and 1456, and secondary optics 1454 and 1458. The LED lighting system 1452 produces light beams 1461 shown between arrows 1461a and 1461b. The LED lighting system 1456 may produce light beams 1462 between arrows 1462a and 1462b. In the embodiment shown in FIG. 14, the light emitted from LED lighting system 1452 passes through secondary optics 1454, and the light emitted from the LED lighting system 1456 passes through secondary optics 1458. In alternative embodiments, the light beams 1461 and 1462 do not pass through any secondary optics. The secondary optics may be or may include one or more light guides. The one or more light guides may be edge lit or may have an interior opening that defines an interior edge of the light guide. LED lighting systems 1452 and/or 1456 may be inserted in the interior openings of the one or more light guides such that they inject light into the interior edge (interior opening light guide) or exterior edge (edge lit light guide) of the one or more light guides. LEDs in LED lighting systems 1452 and/or 1456 may be arranged around the circumference of a base that is part of the light guide. According to an implementation, the base may be thermally conductive. According to an implementation, the base may be coupled to a heat-dissipating element that is disposed over the light guide. The heat-dissipating element may be arranged to receive heat generated by the LEDs via the thermally conductive base and dissipate the received heat. The one or more light guides may allow light emitted by LED lighting systems 1452 and 1456 to be shaped in a desired manner such as, for example, with a gradient, a chamfered distribution, a narrow distribution, a wide distribution, an angular distribution, or the like.

In example embodiments, the systems 1450 and 1452 may be a mobile phone of a camera flash system, indoor residential or commercial lighting, outdoor light such as street lighting, an automobile, a medical device, ARNR devices, and robotic devices. The integrated LED lighting system 1000A shown in FIG. 11, the LED lighting system 1000B shown in FIG. 12, the LED lighting system 1000C shown in FIG. 13, and the LED lighting system 1000D shown in FIG. 14 illustrate LED lighting systems 1452 and 1456 in example embodiments.

The application platform 1460 may provide power to the LED lighting systems 1452 and/or 1456 via a power bus via line 1465 or other applicable input, as discussed herein. Further, application platform 1460 may provide input signals via line 1465 for the operation of the LED lighting system 1452 and LED lighting system 1456, which input may be based on a user input/preference, a sensed reading, a pre-programmed or autonomously determined output, or the like. One or more sensors may be internal or external to the housing of the application platform 1460.

In various embodiments, application platform 1460 sensors and/or LED lighting system 1452 and/or 1456 sensors may collect data such as visual data (e.g., LIDAR data, IR data, data collected via a camera, etc.), audio data, distance based data, movement data, environmental data, or the like or a combination thereof. The data may be related a physical item or entity such as an object, an individual, a vehicle, etc. For example, sensing equipment may collect object proximity data for an ADAS/AV based application, which may prioritize the detection and subsequent action based on the detection of a physical item or entity. The data may be collected based on emitting an optical signal by, for example, LED lighting system 1452 and/or 1456, such as an IR signal and collecting data based on the emitted optical signal. The data may be collected by a different component than the component that emits the optical signal for the data collection. Continuing the example, sensing equipment may be located on an automobile and may emit a beam using a vertical-cavity surface-emitting laser (VCSEL). The one or more sensors may sense a response to the emitted beam or any other applicable input.

In example embodiment, application platform 1460 may represent an automobile and LED lighting system 1452 and LED lighting system 1456 may represent automobile headlights. In various embodiments, the system 1450 may represent an automobile with steerable light beams where LEDs may be selectively activated to provide steerable light. For example, an array of LEDs may be used to define or project a shape or pattern or illuminate only selected sections of a roadway. In an example embodiment, Infrared cameras or detector pixels within LED lighting systems 1452 and/or 1456 may be sensors that identify portions of a scene (roadway, pedestrian crossing, etc.) that require illumination.

FIGS. 1-15 are provided as an example only. At least some of the elements discussed with respect to these figures can be arranged in different order, combined, and/or altogether omitted. It will be understood that the provision of the examples described herein, as well as clauses prefaced with "such as," "e.g.", "including", "in some aspects," "in some implementations," and the like should not be interpreted as limiting the disclosed subject matter to the specific examples.

Although in the above examples, the Buck converter sections, and the switching circuits use MOSFETs as they are primary switching devices, alternative implementations are possible in which another type of switching device can be used. More particularly, any of the MOSFETs discussed in the specification may be replaced with a binary junction transistor (BJT) or any other suitable type of switching device. Furthermore, although in the present example, the voltage comparator 360 is implemented as a non-inverting comparator circuit, any other suitable type of voltage comparator may be used instead. The embodiments described herein are thus not limited to any specific type of voltage comparator. Furthermore, the Buck converter circuits described herein are single-stage Buck converter circuits. Although the embodiments described herein are particularly advantageous when used in conjunction with single-stage Buck converter circuits, alternative implementations are possible in which multi-stage Buck converter circuits are used instead.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. An integrated light emitting diode (LED) lighting system comprising:
    an alternating current (AC) input configured to receive a sinusoidal input voltage;
    a load circuit comprising:
        a first plurality of LED devices coupled in parallel with a first capacitive element and a second plurality of LED devices coupled in parallel with a second capacitive element, the first plurality of LED devices and the second plurality of LED devices being coupled together at a first location, and
        a switching element coupled in series with the first and second capacitive elements on a first electrical path between the location and a first node;
    a single stage buck converter circuit, electrically coupled between the AC input and the first plurality of LED devices, configured to provide a drive current to the load circuit; and
    a switching circuit on a second electrical path between the first location and a second node, the switching circuit comprising an input electrically coupled to a second location between the AC input and the single stage buck converter circuit to sense an instantaneous voltage of the sinusoidal input voltage and configured to close the second electrical path to divert the drive current at the first location away from the second plurality of LED devices along the second path when the instantaneous voltage is less than a threshold voltage of the load circuit and to open the second electrical path when the instantaneous voltage is greater than the threshold voltage of the load circuit.

2. The system of claim 1, wherein the threshold voltage of the load circuit equals a total threshold voltage of the first and second plurality of LED devices.

3. The system of claim 1, wherein the switching circuit comprises a switch coupled to the first location and a comparator coupled to the switch, and the comparator is configured to switch the switch to an on state to disconnect the second plurality of LED devices from the drive current in response to the instantaneous voltage dropping below the threshold voltage of the load circuit.

4. The system of claim 1, wherein each of the first plurality of LED devices and the second plurality of LED devices comprises a plurality of LED devices electrically coupled together in at least one of in series and in parallel.

5. The system of claim 1, further comprising a rectifier element coupled to the single stage buck converter circuit.

6. A method comprising:
  receiving a signal having an alternating current (AC) and a sinusoidally varying voltage;
  converting the AC to a direct current (DC) using a single stage buck converter circuit;
  supplying the DC from the single stage buck converter circuit to a series string of a first plurality of LED devices and a second plurality of LED devices, the first plurality of LED devices and the second plurality of LED devices being coupled together at a first location on a first electrical path;
  sensing an instantaneous voltage of the sinusoidal input voltage at a second location between the AC input and the single stage buck converter circuit;
  maintaining a switch, on a second electrical path between the first location and a node, in an ON state to close the second electrical path and divert the DC current along the second electrical path to by-pass the second plurality of LED devices when the instantaneous voltage is below a threshold voltage of the first and second plurality of LED devices;
  maintaining the switch in an OFF state to open the second electrical path when the instantaneous voltage is greater than the threshold voltage of the first and second plurality of devices; and
  supplying the second plurality of LEDs with a current from an alternate source when the DC current is diverted.

7. The method of claim 6, wherein the diverting the DC current further comprises diverting the DC current on a condition that the instantaneous voltage is between a threshold voltage of the first plurality of LED devices and the threshold voltage of the series string of the first plurality of LED devices and the second plurality of LED devices.

8. The system of claim 1, wherein the switching element is one of a diode and an active switching device.

9. The method of claim 6, wherein the current from the alternate source is supplied by a capacitive element.

10. The method of claim 6, wherein the diverting the DC current does not short the first and second plurality of LED devices.

11. The system of claim 1, wherein the threshold voltage of the load circuit is constant.

12. The method of claim 6, wherein the threshold voltage is constant.

\* \* \* \* \*